(12) United States Patent
Guilbault et al.

(10) Patent No.: US 6,565,299 B1
(45) Date of Patent: May 20, 2003

(54) CARGO RETAINING APPARATUS

(75) Inventors: Mario Guilbault, Mascouche (CA); Pascal Forbes, Deux-Montagnes (CA)

(73) Assignee: Moody Industries Inc., Quebec (CA)

( * ) Notice: Subject to any disclaimer, the term of this patent is extended or adjusted under 35 U.S.C. 154(b) by 0 days.

(21) Appl. No.: 10/034,088

(22) Filed: Dec. 27, 2001

(51) Int. Cl.$^7$ ................................................. B60P 7/08
(52) U.S. Cl. ............................. 410/69; 410/1; 410/77; 410/80; 410/92
(58) Field of Search ............................... 410/1, 77, 80, 410/69, 92; 248/500, 503; 193/35 R; 414/536

(56) References Cited

U.S. PATENT DOCUMENTS

| | | | |
|---|---|---|---|
| 3,158,106 A | * 11/1964 | Clejan | |
| 3,282,550 A | * 11/1966 | Warren | |
| 3,399,921 A | 9/1968 | Trost et al. | |
| 3,778,012 A | 12/1973 | Fernandez | |
| 3,810,534 A | 5/1974 | Prete, Jr. | |
| 4,234,278 A | * 11/1980 | Harshman et al. | 410/69 |
| 4,415,298 A | * 11/1983 | Voigt | 410/69 |
| 4,676,705 A | * 6/1987 | Kuster et al. | 410/80 |
| 4,696,609 A | 9/1987 | Cole | 410/69 |
| 5,109,971 A | 5/1992 | Riner | |
| 5,112,173 A | * 5/1992 | Eilenstein et al. | 410/79 |
| 5,575,599 A | 11/1996 | Conlee et al. | 410/69 |
| 5,871,317 A | * 2/1999 | Herber et al. | 410/79 |
| 6,315,508 B1 | * 11/2001 | Nadon | 410/80 |

OTHER PUBLICATIONS

Specifications brochure for the LD–2, LD–3 Container Dolly, produced by Bentz Mobile Products (1982).
Specifications brochure for the Cargo Trailer, produced by Bentz Mobile Products (1982).
Specifications brochure for the Container Trailer, Model Nos. 2106, produced by Clyde Machines (1985).
Specifications brochure for the Double Container Trailer, Model No. 2561, produced by Clyde Machines (1985).
Specifications brochure for the Caster Bed Pallet Trailer, Model No. 2710, produced by Clyde Machines (1985).
Specifications brochure for the Covered Caster Bed Pallet Trailer, Model No. 2462, produced by Clyde Machines (1985).
Specifications brochure for the Turntable Dolly, Model No. A04286D, produced by Watkins Aircraft Support Products (1985).
Specifications brochure for the Turntable Dolly, Model No. A04603D, produced by Watkins Aircraft Support Products (1985).
Specifications brochure for the Cargo Trailer, Model No. A02283D, produced by Watkins Aircraft Support Products (1985).
Specifications brochure for the Cargo Trailer, Model No. A01944D, produced by Watkins Aircraft Support Products (1985).
Specifications brochure for the Cargo Trailer (Inverted Caster Pallet Dolly), produced by Watkins Aircraft Support Products (1985).

(List continued on next page.)

*Primary Examiner*—Stephen T. Gordon
(74) *Attorney, Agent, or Firm*—Heller Ehrman White & McAuliffe

(57) ABSTRACT

An apparatus for automatically gripping and retaining cargo on a platform includes spaced apart hooks for rotation from retracted positions beneath the platform to extended, cargo engaging positions, in which the hooks engage opposite sides or ends of the cargo; a pivot arm rotatably mounted in the platform and normally extending above the platform, the arm being moved downwardly by the cargo to operate linkage assemblies which cause the hooks to rotate upwardly to the cargo engaging positions. The hooks are returned to the retracted positions by foot pedal operated levers beneath the platform.

8 Claims, 6 Drawing Sheets

OTHER PUBLICATIONS

Specifications brochure for the Cargo Trailer (Caster Bed Dolly), produced by Watkins Aircraft Support Products (1985).

Specifications brochure for the Container Dolly, Model Nos. A04283D, A04299D, A04301D, produced by Watkins Aircraft Support Products (1985).

Specifications brochure for the Container Dolly, Model No. A04230D, produced by Watkins Aircraft Support Products (1985).

Specifications brochure for the Turntable Dolly, Model No. A04284D, produced by Watkins Aircraft Support Products (1985).

Specifications brochure for the Container Dolly, Model No. A04296D, produced by Watkins Aircraft Support Products (1985).

Specifications brochure for the Container Dolly, Model No. A04012D, produced by Watkins Aircraft Support Products (1985).

Specifications brochure for the Container Dolly, Model Nos. A04307D, A04300D, produced by Watkins Aircraft Support Products (1985).

Specifications brochure for the Rotary Container Transport, produced by Tri-Tech Services (1988).

* cited by examiner

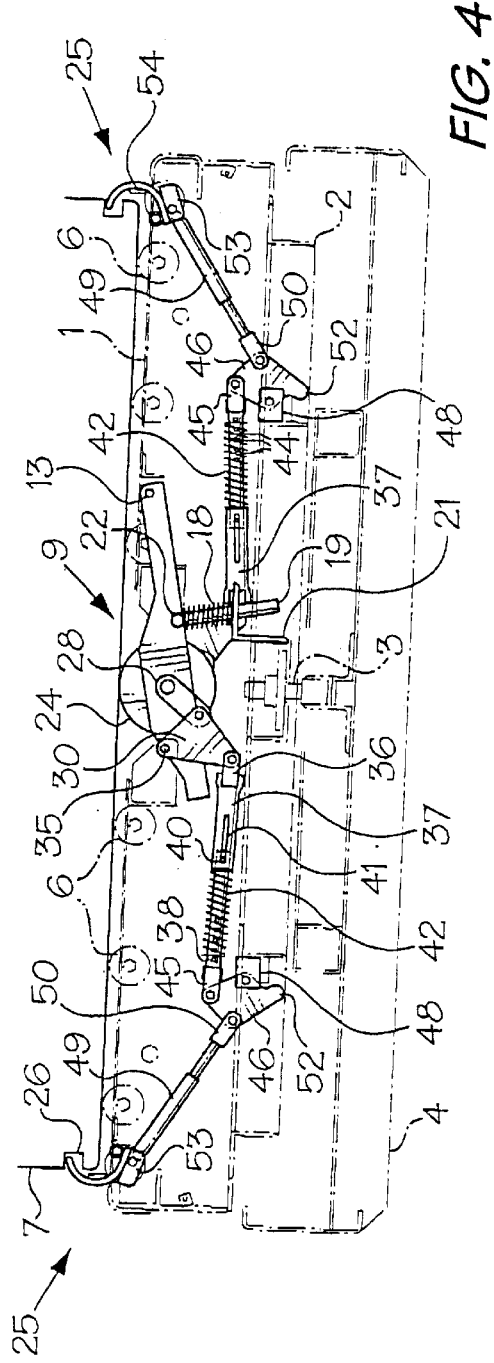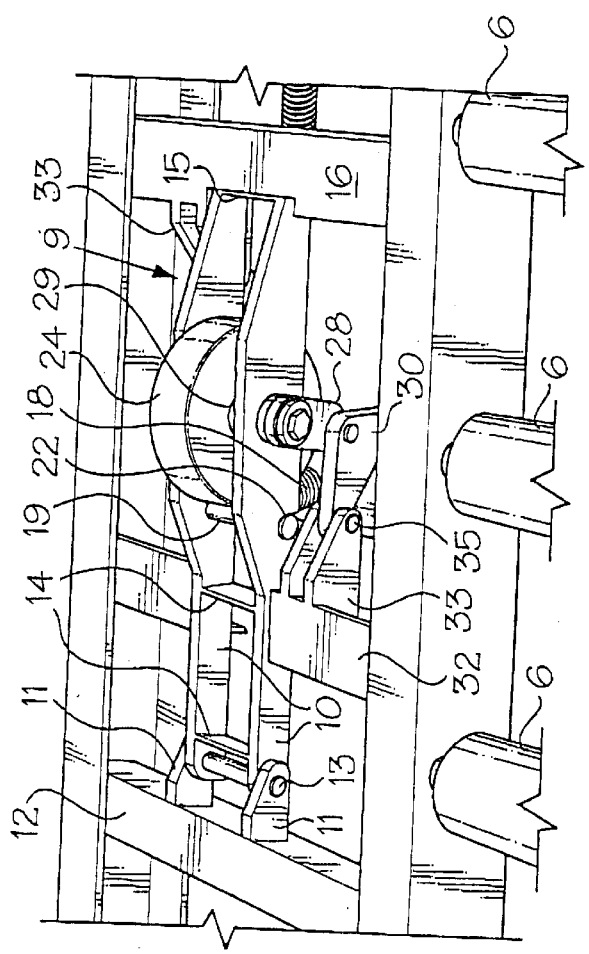

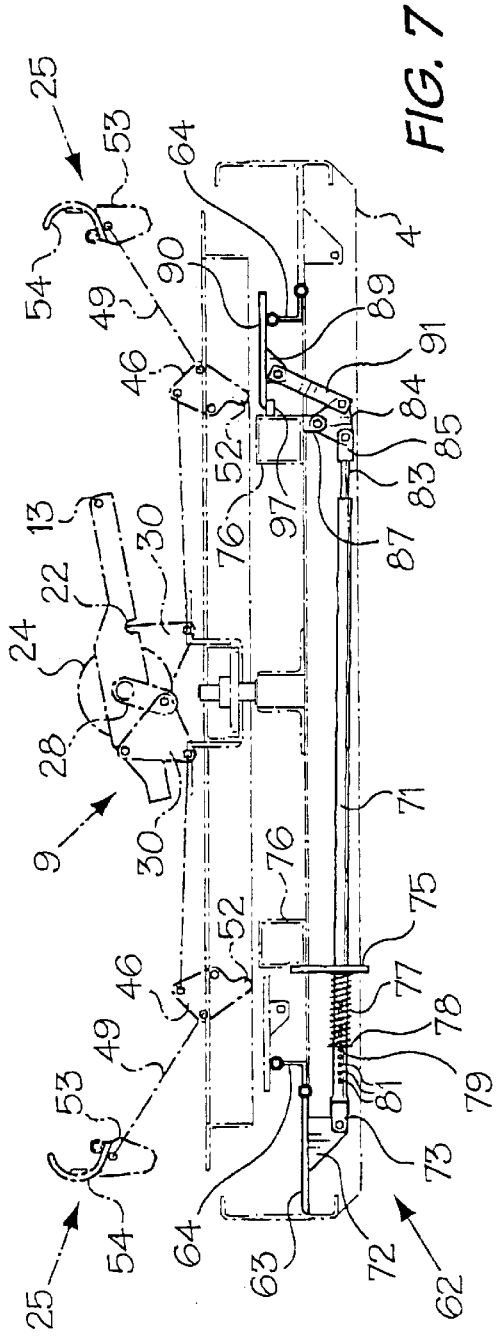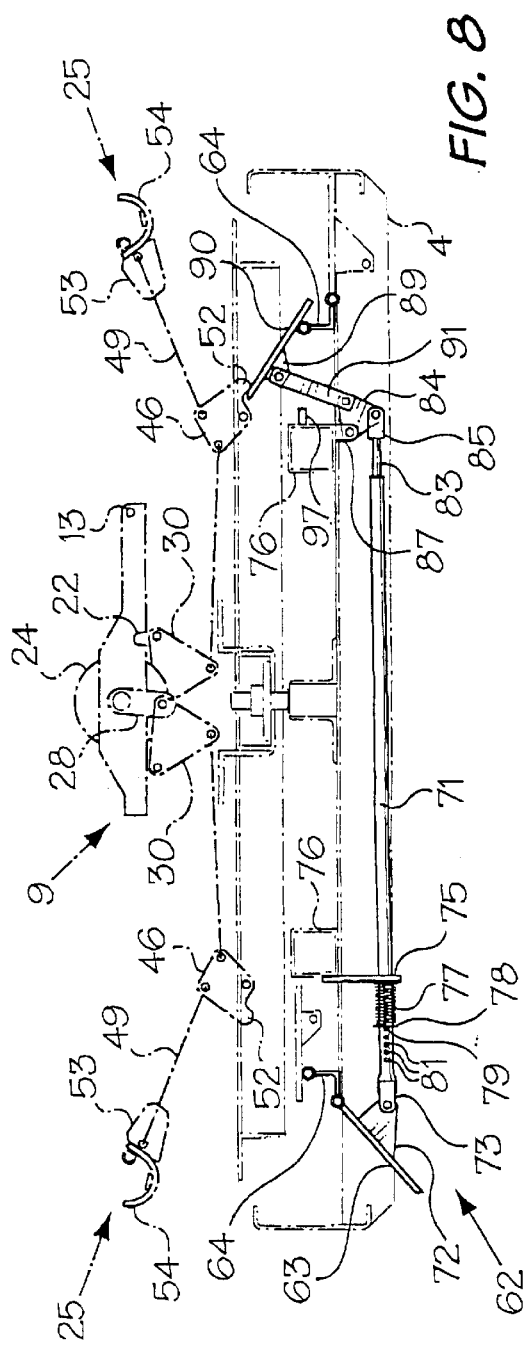

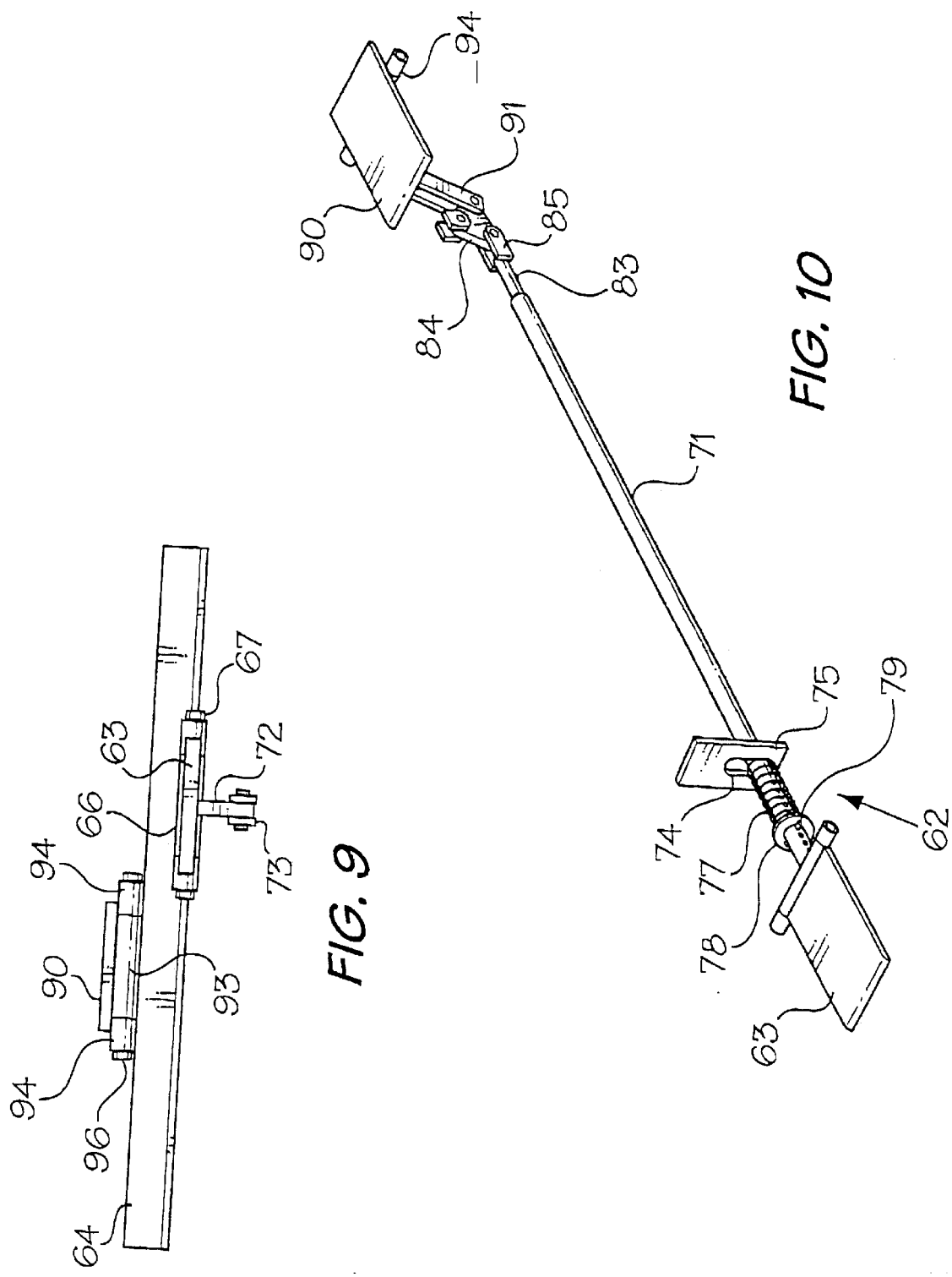

CARGO RETAINING APPARATUS

BACKGROUND OF THE INVENTION

1. Field of the Invention

This invention relates to an apparatus for retaining cargo on a platform.

The apparatus described herein was designed for use on a container trailer of the type used to load baggage on an aircraft. Such a trailer is described in U.S. Pat. No. 4,049,286, issued to G. W. Francis, Jr. on Sep. 20, 1977. As mentioned in the Francis patent, because the containers have a relatively large height to width ratio, the baggage containers must be firmly latched in position to prevent both horizontal and vertical movement.

2. Discussion of the Prior Art

Of course the need for firmly latching a load in position is not limited to baggage trailers. Loads on trucks, and in tractor trailers and other vehicles are often locked in position to prevent shifting during travel. Examples of mechanisms for latching loads in position are disclosed in U.S. Pat. No. 3,399,921, issued to P. E. Frost et al on Sep. 3, 1068; U.S. Pat. No. 3,778,012, issued to R. J. Ferandez on Dec. 11, 1973; U.S. Pat. No. 3,810,534, issued to E. Prete, Jr. on May 14, 1974; U.S. Pat. No. 4,415,298, issued to W. Voight on Nov. 15, 1983; U.S. Pat. No. 4,696,609, issued to S. C. Cole on Sep. 29, 1987; U.S. Pat. No. 5,109,971, issued to F. Riner on May 5, 1992 and U.S. Pat. No. 5,575,599, issued to J. A. Conlee et al on Nov. 19, 1996.

For the most part, the patented devices, including the Francis assembly, are not fully automatic, are somewhat complicated or do not engage opposite sides of a load for latching the load in position. As mentioned above, it is important to engage a load at opposite sides to limit or prevent horizontal movement, and, in most cases, to also limit or prevent vertical movement of the load. While the Francis assembly is adapted to engage opposite sides of a container, the assembly is not automatic, i.e. it is necessary to operate a crank manually in order to effect latching. Thus, a need still exists for a fully automatic mechanism or apparatus for retaining cargo on a platform which is actuated by loading of the cargo onto the platform.

GENERAL DESCRIPTION OF TIME INVENTION

An object of the present invention is to meet the above defined need by providing a fully automatic apparatus for holding cargo in position on a platform which, when actuated by loading of the cargo onto the platform, engages opposite sides of the cargo.

In broadest terms, the invention is an apparatus for retaining cargo on a platform comprising:

(a) a pair of spaced apart retaining means in said platform for movement between a retracted position below a top of said platform and an extended position above said top surface of the platform;

(b) pivot arm means in said platform normally projecting above the top of the platform for downward movement when engaged by cargo placed on the platform; and (c) linkage means connecting said pair of retaining means to said pivot arm means for causing said retaining means to move from the retracted position to an extended position to engage the cargo at spaced apart locations for retaining the cargo on the platform.

In a preferred form, the apparatus, which is intended for use with a container platform having a top surface defined by rollers, includes a small aim pivotally mounted at the center of the platform and a roller in the frame normally projecting above the platform. When the roller is contacted by a container sliding onto the platform, it causes pivoting of the arm, actuating a pair of linkage assemblies which bias two books upwardly. A first of the hooks (in front of the container in the direction of container movement) pops up into position in the path of travel of the container. The other hook is held down by the container. As the front end of the container engages the first hook, the second hook is free of the container and snaps into position at the rear end of the container to latch the container in position, the hooks preventing vertical and horizontal movement of the container. The hooks are released individually by pedal operated release assemblies. By releasing one end or side of a container, the container can be slid from the platform.

BRIEF DESCRIPTION OF THE DRAWINGS

The invention is described below in greater detail with reference to the accompanying drawings, which illustrate a preferred embodiment of the invention, and wherein:

FIGS. 2 to 4 are schematic side views of the top portion of the apparatus of FIG. 1;

FIG. 5 is a perspective view of a pivot arm used in the apparatus of FIGS. 1 to 4;

FIGS. 7 and 8 are side views of a release mechanism used in the apparatus of FIGS. 1 to 4;

FIG. 9 is an end view of the release mechanism of FIGS. 7 and 8, and

FIG. 10 is an isometric view of the main elements of the release mechanism of FIGS. 7 and 8.

DESCRIPTION OF THE PREFERRED EMBODIMENT

Figure 1:
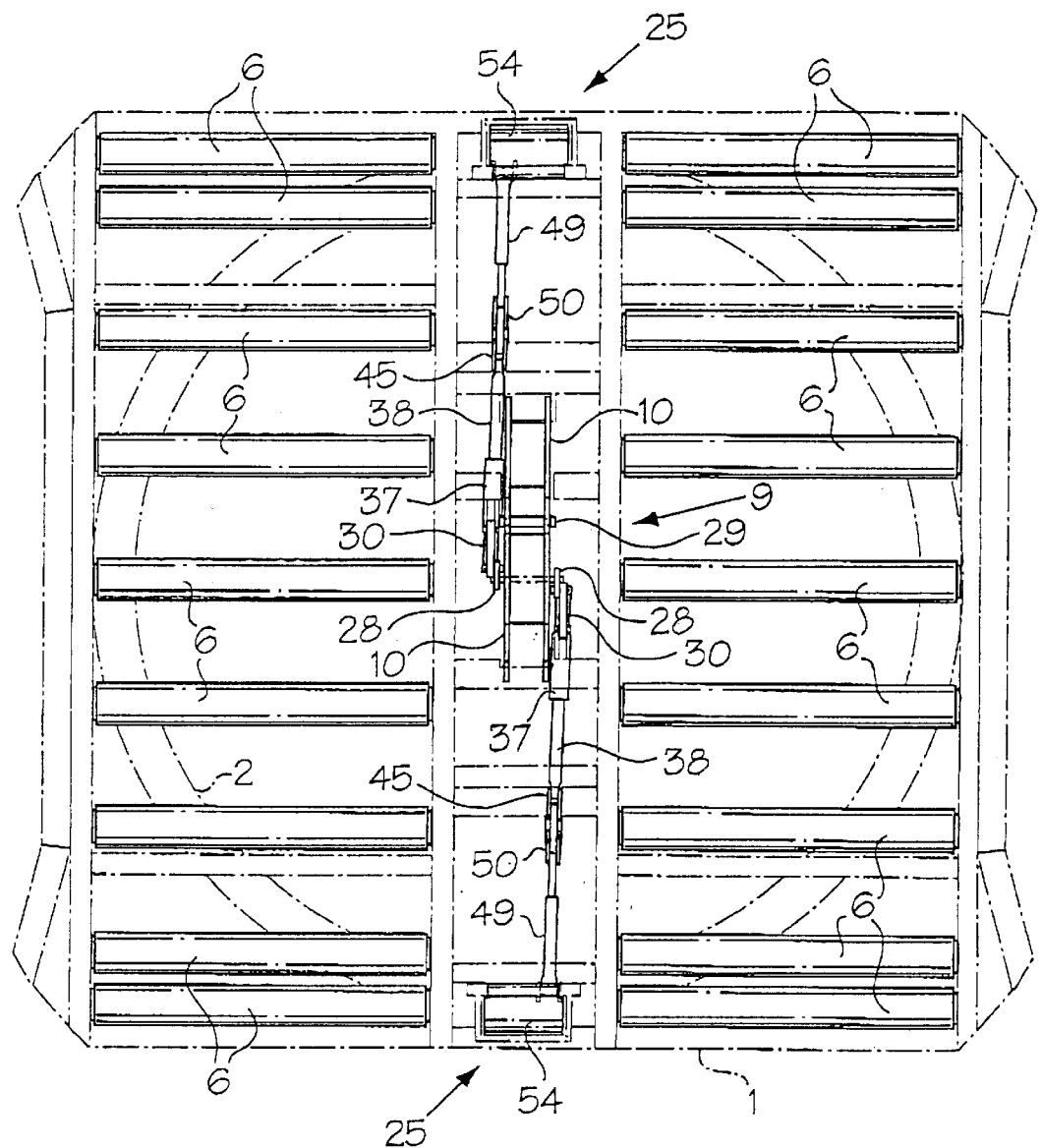
FIG. 1 is a top view of the platform of a container trailer incorporating an apparatus in accordance with the present invention.

Referring to FIGS. 1 to 4, the apparatus of the present invention is intended for use in a platform 1. The platform 1 forms part of a turntable 2, which is rotatable on a shaft 3 extending upwardly from a base 4. As mentioned above, the base 4 forms part of a container trailer of the type commonly seen at airports. However, the base turntable and platform combination can be used on other vehicles. The platform 1, the turntable 2 and the base 4 do not form part of the present invention (except when the platform is in combination with the apparatus) and accordingly none of these elements is described in great detail. The platform 1 is defined by a generally rectangular frame, which carries a plurality of rollers 6 for slidably receiving cargo, which in this case is containers 7 (one shown in FIGS. 2 to 4). The retaining apparatus of the present invention is designed to automatically lock the container 7 in position on the platform 1.

The retaining apparatus includes a pivot arm indicated generally at 9 mounted in an opening in the center of the platform 1. As best shown in FIG. 5, the pivot arm 9 is defined by a pair of parallel sides 10 which are pivotally connected to lugs 11 extending outwardly from a crossbar 12 of the platform 1 by a bolt 13. Crossbars 14 and an end plate 15 extend between the sides 10 of the pivot arm 9 for reinforcing the latter. Upward movement of the free end of the aim 9 is limited by another crossbar 16 on the platform 1. The arm 9 is biased to the upper position against the crossbar 16 by a helical spring 18. The spring 18 is mounted on the stem of a T-shaped pin 19. The bottom end of the pin 19 is slidably mounted in an angle iron crossbar 21 (FIGS. 2 to 4) on the turntable 2. The ends of the top arm of the pin 19 are rotatably mounted in inverted U-shaped grooves 22 in the sides 10 of the arm 9. For such purpose, annular grooves (not shown) are provided near each end of the top arm of the pin 19.

The arm 9 is caused to move downwardly when a container 7 slides onto a roller 24 rotatably mounted in the arm 9 between the sides 10 thereof. As shown in FIG. 3, the container 7 pushes the roller 24 and consequently pivots the arm 9 downwardly, compressing the spring 18. Downward movement of the arm 9 biases a pair of hooks indicated generally at 25 upwardly from a release or retracted position beneath the top of the platform (FIG. 2) to an extended or retaining position (FIG. 4) in which the hooks 25 enter grooves 26 in opposite sides or ends of a container 7. As best shown in FIG. 1, one end of the hook 25 at one end of the platform 1 is more or less aligned with one end of the roller 24, and the hook 25 at the other end of the platform is likewise aligned with the other end of the roller 24. The hooks 25 are connected to opposite ends of the roller 24 by identical linkage assemblies, which are mirror images of each other and accordingly, only one assembly is described in detail below.

Each linkage assembly includes a connecting arm 28 pivotally connected at one end to a shaft 29 (FIG. 5) carrying of the roller 24 outside of the side 10 of the pivot arm 9. The other end of the arm 28 is pivotally connected to one top corner of a triangular lever 30. An adjacent top corner of the lever 30 is pivotally connected to a platform crossbar 16 or 32 by a clevis 33 (FIG. 5) and a pin 35. The third (bottom) corner of the lever 30 is pivotally connected by a clevis 36 (FIGS. 2 to 4) to one, crimped end of a sleeve 37. A rod 38 (FIG. 6) is slidably mounted for longitudinal movement in the other end of the sleeve 37. A pin 40 extends diametrically through the rod 38 and through diametrically opposed, longitudinally extending slots 41 (one shown) in the sleeve 37. Thus, longitudinal movement of the sleeve 37 on the rod 36 is permitted, but rotation is prevented. A helical compression spring 42 is mounted on the rod 38 between a pin 43 (FIG. 6) near the outer end of the rod and the sleeve 37. When the pivot arm 9 is in the elevated position (FIG. 2), the spring 42 is in the relaxed condition. When the arm 9 rotates downwardly, the connecting arm 28 pushes downwardly on the lever 30 causing it to rotate around the axis of the pin 35, pushing the sleeve 37 outwardly toward the hook 25. If the hook 25 is free to rotate, the spring 42 is only slightly compressed. If the hook 25 is not free to rotate (being under a container 7), the rod 38 slides into the sleeve 37 and the spring 42 is compressed. A plurality of holes 44 are provided in the rod 38 for receiving the pin 43, so that the compression of the spring 42 can be changed.

The outer end of the rod 38 is pivotally connected by a clevis 45 to one top corner of a second, generally triangular lever 46. The bottom corner of the lever 46 is pivotally connected to the turntable 2 by a clevis 48. A hook actuating rod 49 is pivotally connected to the outer top corner of the lever 46 by a clevis 50. A release arm 52 extends outwardly and downwardly from the side of the lever 46 beneath the outer top corner of the lever, i.e. between the clevis 50 and the pin 47.

Figure 6:
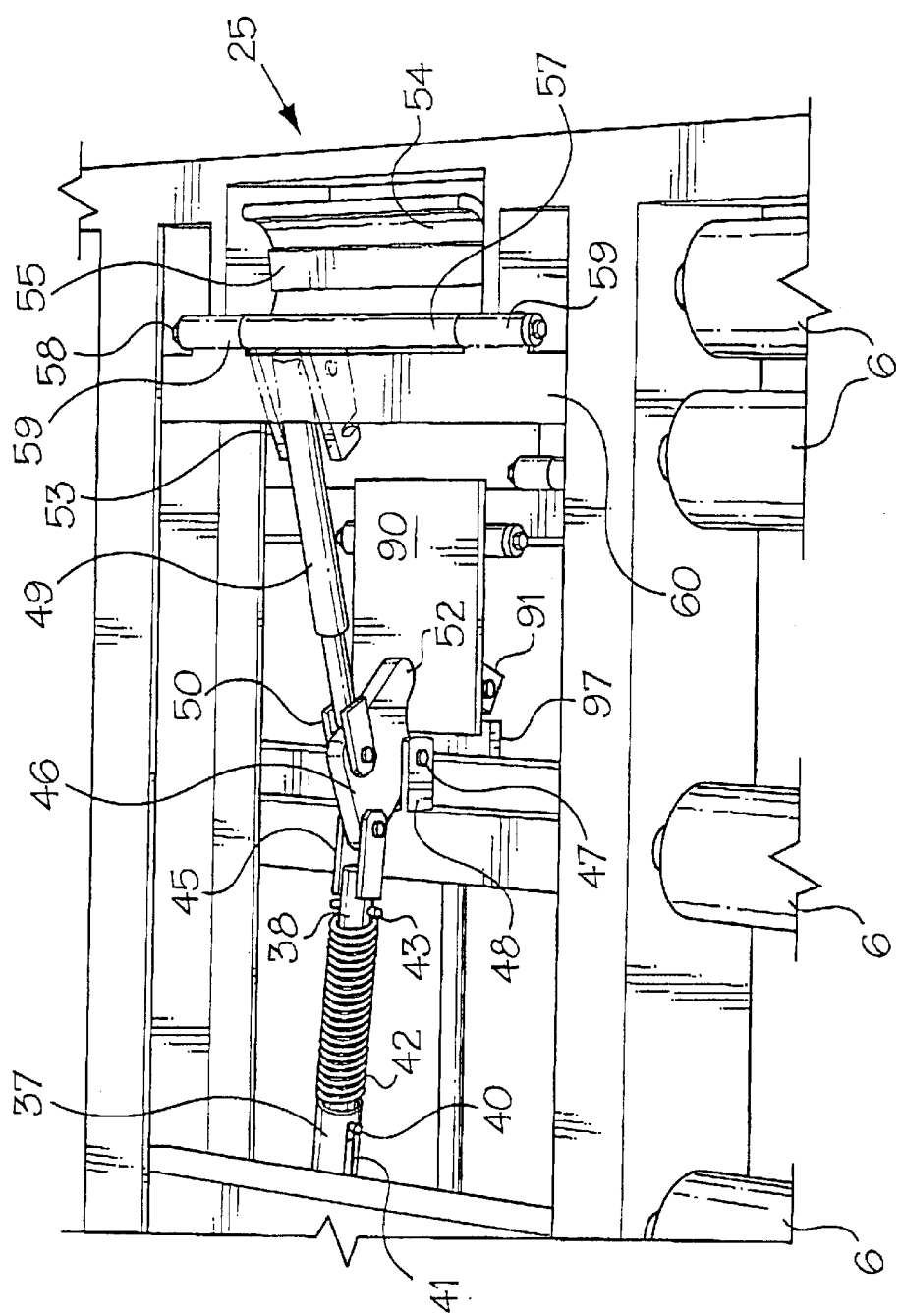
FIG. 6 is a perspective view of a linkage assembly used in the apparatus of FIGS. 1 to 4.

The outer end of the hook actuating rod 49 is pivotally connected to a hook 25 by a clevis 53 on the bottom of the hook. As best shown in FIG. 6, each hook 25 is defined by an arcuate plate 54 reinforced by a longitudinally extending central strip 55. A sleeve 57 on the inner end of the plate 54 is mounted on a shaft 58 extending through spaced apart sleeves 59 welded to a platform crossbar 60. Thus, outward movement of the rod 49 causes the hook plate 54 to rotate from a rest or retracted position (FIGS. 2 and 6) beneath the top of the platform 1 to an extended or retaining position (on the right in FIG. 3) for engaging the groove 26 in one side of the container 7. It will be noted that when the lever 46 is rotated from the rest position (FIG. 2) to the hook actuating position (FIG. 3 on the right and FIG. 4), the lever 46 rotates over center, i.e. beyond the position in which the longitudinal axes of the sleeve 37 and the rod 38 are aligned with the hook actuating rod 49. Thus, the hook 25 is releasably locked in the elevated, cargo retaining position.

Referring to FIGS. 6 to 10, the hooks 25 are released by a pair of release mechanisms indicated generally at 62. It will be appreciated that the two release mechanisms are mirror images of each other, and accordingly only one is described in detail. Each release mechanism 62 includes a foot operated pedal 63, which is pivotally mounted on a turntable crossbar 64 beneath the top of the platform 1. The pedals 63 are accessible to an operator from opposite ends of the platform 1. A sleeve 66 on the inner end of each pedal 63 receives a pin 67 extending through axially aligned, spaced apart sleeves on the angle iron crossbar 64. An elongated rod 71 extending beneath the turntable 2 is connected to an arm 72 extending downwardly from the pedal 63 by a clevis 73. The rod 71 extends through a vertical slot 74 in a rectangular guide plate 75, which is attached to a turntable crossbar 76. Thus, the rod 71 can move vertically but not laterally. A helical spring 77 is mounted on the rod 71 between the plate 75 and a washer 78, which is held in place by a pin 79 extending through a diametrically extending hole 81 in the rod. The spring 77 returns the pedal 63 to the rest position (FIG. 7) from a depressed or release position (FIG. 8).

The other end 83 of the rod 71 is pivotally connected to one bottom corner of a triangular lever 84 by a clevis 85. The top corner of the lever 84 is pivotally connected to the opposite turntable crossbar 76 by a clevis 87. The outer bottom corner of the lever 84 is pivotally connected to a lug 89 on the bottom of a release lever 90 by an arm 91. The outer end of the release lever 90 is pivotally mounted on the other angle iron crossbar 64 on the base 4 by means of sleeves 93 and 94 (FIG. 9) on the lever 90 and the crossbar 64, respectively, and a pin 96. Downward movement of the inner end of the lever 90 is limited by a ledge 97 extending outwardly from the turntable crossbar 76.

When a pedal 63 is depressed, i.e. pivoted around the axis of the pin 67, the rod 71 is pushed towards the opposite end of the platform 1. Longitudinal movement of the rod 71 rotates the lever 84 and consequently the lever 90. The free end of the lever 90 presses against the release arm 52 on the lever 46 to rotate the latter, thus, raising the inner end of the hook actuating rod 49 to return the hook 25 to the retracted position beneath the top of the platform 1. Simultaneously, the spring 18 returns the pivot arm 9 to the rest position.

Figure 2:
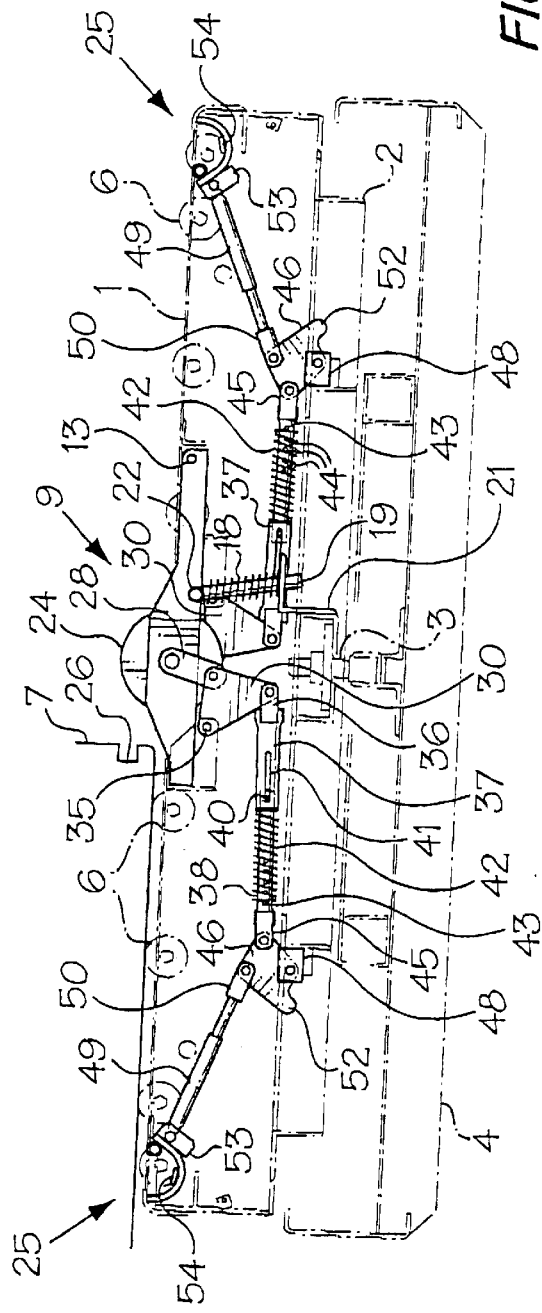
Figure 3:
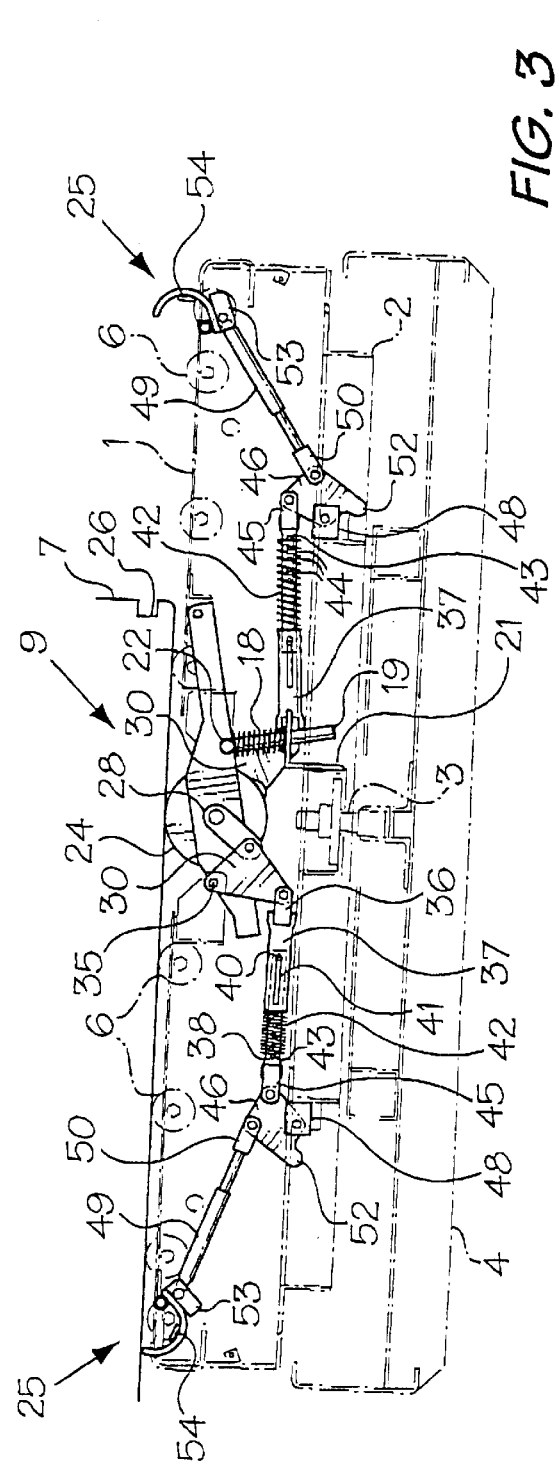

Referring again to FIGS. to 4, operation of the apparatus can be summarized as follows:

With the hooks 25 retracted (FIG. 2), a container 7 is slid onto the platform 1, i.e. onto rollers 6 (FIG. 2).

When the leading edge (in the direction of travel) of the container 7 encounters the roller 24, the latter is pressed down with the remainder of the pivot arm 9 to a position beneath the top of the platform 1.

Downward movement of the arm 9 causes rotation of the levers 30 biasing the linkage assemblies towards the hooks 25. In the case of the hook 25 which is in front of the container 7 (in the direction of container travel), the hook 25 pivots upwardly into the path of travel of the container. The other hook 25 is held down by the container the spring 42 on the associated rod 38 being compressed (FIG. 3).

When the container 7 passes the trailing hook 25, the latter pops up to enter the groove 26 in the trailing and of the container (FIG. 4), thus firmly latching the container 7 in position, preventing vertical or horizontal movement thereof.

In order to unload the container 7, one of the foot pedals 63 is depressed (FIG. 8) which causes pivoting of the lever 90 which pushes against the release arm 52 on the lever 46 to rotate the latter. When the lever 46 is rotated to the start or normal rest position one, hook 25 at the opposite end of the depressed pedal 63 is rotated to the retracted position (FIG. 1), and container can be slid from the platform 1 in a direction away from the depressed pedal 63. Returing the other hook 25 to the retracted position, permits the spring 18 to return the pivot arm 9 to the up or extended position (FIG. 2).

It will be understood that the pivot arm 9 can also be engaged by overhead loading of cargo onto the platform 1. In addition, the hooks 25 can equally engage containers having lips along the side of the container with no grooves 26.

In alternate embodiments, the hooks 25 can be modified to suit the configuration of the cargo or container.

What is claimed is:

1. A system for retaining cargo on a platform comprising:
   (a) a pair of spaced apart retaining means in said platform for movement between a retracted position below a top of said platform and an extended position above said top of the platform;
   (b) pivot arm means in said platform normally projecting above the top of the platform for downward movement when engaged by cargo placed on the platform; and
   (c) linkage means connecting said pair of retaining means to said pivot arm means for causing said retaining means to move from the retracted position to the extended position to engage the cargo at spaced apart locations for retaining the cargo on the platform.

2. The system of claim 1, including first spring means in said platform biasing the pivot means to a position projecting above the platform.

3. The system of claim 2, wherein said linkage means includes a pair of link arms extending in opposite directions from said pivot arm means to said retaining means beneath the top of the platform; and second spring means biasing said link arms to a rest position in which said retaining means are in the retracted position.

4. The system of claim 3, wherein said cargo is a container having grooves or lips in opposite sides near a bottom end thereof; and said retaining means includes a pair of opposed hooks each having a first end pivotally connected to said platform and to said linkage means, and a second, free end for entering one of said grooves or engaging one of said lips to firmly anchor the container to the platform.

5. The system of claim 4, wherein said pivot arm means includes frame means having one end pivotally connected to said platform and roller means carried by said frame means normally projecting above the top of the platform for slidably receiving cargo, whereby cargo sliding onto the platform presses the roller means and frame means downwardly to move the retaining means to the extended position.

6. The system of claim 1, wherein said linkage means includes first lever means pivotally mounted in said platform for moving said retaining means to the extended position and for maintaining the retaining means in the extended position.

7. The system of claim 6, including release means for returning said retaining means from the extended position to the retracted position.

8. The system of claim 7, wherein said release means includes second lever means for rotating said first lever means to return the retaining means to the retracted position; and pedal means for depressing said second lever means.

* * * * *

UNITED STATES PATENT AND TRADEMARK OFFICE
CERTIFICATE OF CORRECTION

PATENT NO.     : 6,565,299 B1
DATED          : May 20, 2003
INVENTOR(S)    : Guibault et al.

It is certified that error appears in the above-identified patent and that said Letters Patent is hereby corrected as shown below:

<u>Column 1,</u>
Line 44, the portion of the heading that reads as "OF TIME" should read as
-- OF THE --.

Signed and Sealed this

Fourteenth Day of October, 2003

JAMES E. ROGAN
*Director of the United States Patent and Trademark Office*